United States Patent [19]

Casacci

[11] 4,278,108
[45] Jul. 14, 1981

[54] CONTROL MECHANISM FOR TWO CUT-OFF DEVICES MOUNTED IN SERIES

[75] Inventor: Severin Casacci, Corenc, France
[73] Assignee: Neyrpic, Corenc, France
[21] Appl. No.: 128,561
[22] Filed: Mar. 10, 1980
[51] Int. Cl.³ .................. F16K 5/20; F16K 31/12
[52] U.S. Cl. .................. 137/613; 251/58; 251/62; 251/304
[58] Field of Search .................. 137/613, 614; 251/58, 251/62

[56] References Cited

U.S. PATENT DOCUMENTS

| | | | |
|---|---|---|---|
| 3,261,266 | 7/1966 | Ledeen et al. | 251/58 |
| 3,275,286 | 9/1966 | Wood | 251/61 |
| 3,410,422 | 11/1968 | Carpentier | 251/62 |
| 3,523,320 | 10/1970 | Fisch | 251/62 |
| 3,539,147 | 11/1970 | Paul, Jr. | 251/58 |

FOREIGN PATENT DOCUMENTS 418707  3/1947  Italy ........................................ 137/613

Primary Examiner—Martin P. Schwadron
Assistant Examiner—A. Michael Chambers
Attorney, Agent, or Firm—Haseltine and Lake

[57] ABSTRACT

A mechanism for controlling two rotatable cut-off devices which are mounted in series in a shell for connection to one and the same pipe, comprises a jack in respect of each cut-off device, each jack being articulated to a lever fast with a journal of a respective one of the cut-off devices and to the shell in the zone thereof supporting the journals of the other cut-off device.

The invention is particularly applicable to the valves for protecting a hydraulic machine in a high-fall hydraulic power station.

5 Claims, 6 Drawing Figures

CONTROL MECHANISM FOR TWO CUT-OFF DEVICES MOUNTED IN SERIES

The present invention relates to a control mechanism for two cut-off devices mounted in series for connection to one and the same pipe, which mechanism is particularly but not exclusively intended for the spherical valves of a high-fall hydraulic power installation.

In installations of this type, comprising turbines having fixed guide-rings, or turbine pumps, two valves are arranged in series, as a safety measure, in order to protect the hydraulic machinery. The upstream valve constitutes the safety device for emergency shut-off if there is an accident involving the downstream valve or the downstream pipe; shut-off in the latter case is referred to as "open sluice" shut-off. The downstream valve ensures the normal opening and closing operations.

Hitherto, the cut-off devices of these valves have been controlled in a conventional manner, as for single valves, that is to say by means of hydraulic jacks anchored to the ground in concrete or fixed to the shell of the valve.

The conventional control, shown in this figure for a single valve, comprises one (or two) jacks acting on one (or both) of the ends of the journals of the cut-off device. The or each jack 4 applies a torque to the journal via a lever 1 keyed on the journal 2. The end fork-joint of the rod of the piston oscillates about an axle 3 fixed to the lever 1. The cylinder of the jack 4 oscillates about the axle 5 of a fork-joint anchored in concrete.

In installations with two such valves in series, there are two identical sets of such control equipment. The forces involved in operating a cut-off device can exceed a hundred tonnes. The concrete beds must therefore be capable of withstanding additional tensile and compressive stresses, and this necessitates expensive civil engineering work.

Alternatively, jacks fixed directly to the shell of the valve can be employed. French Pat. No. 1,363,146 illustrates a control of this type in the case of a single valve. In this arrangement, the flanges for fixing the jacks adjoin the shell and greatly complicate the geometrical shapes. Concentrations of stress appear at right-angles to the reinforcements and require an increase in dimensions, thus involving a greater cost than in the case of a shell of which the shape remains approximately spherical.

It is an aspect of the present invention to provide a new solution whereby the shell retains a simple shape and the need to apply the operating forces to the foundations is avoided.

According to the invention there is provided a mechanism for independently controlling two cut-off devices arranged in series for connnection to one and the same pipe, each cut-off device being mounted for rotation in journals carried by fixed shell means and being rotatable by an operating lever externally of the shell means and fast with a respective journal, said mechanism comprising a jack in respect of each cut-off device, each jack being articulated to said operating lever of a respective one of said cut-off devices and to said shell means in the zone thereof supporting said journals of said other one of said cut-off devices.

According to a particular embodiment of the invention each of said cut-off devices is provided with only one operating lever fast with a respective one of said journals thereof, each of said levers being located respectively on a different side of said shell means, each jack for operating a said cut-off device being articulated on said shell means around the end of the other one of said journals of said other respective cut-off device which is not provided with said lever.

Embodiments of the invention will now be described, by way of example only with reference to FIGS. 1 to 6 of the drawings.

In the drawings:

FIG. 1 of the drawings is a simplified representation of a known control by means of jack anchored in concrete.

FIG. 2 is a side elevation, and FIG. 3 is a top view with a partial view in section.

Figure 2:
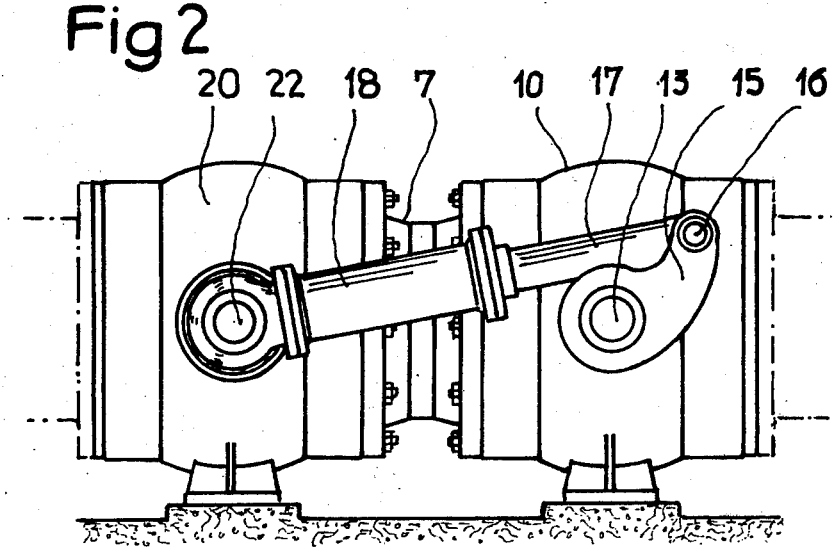
FIGS. 2 and 3 show external views of two spherical valves mounted in series for connection to one and the same pipe, with an embodiment of a cut-off control mechanism according to the invention.
Figure 3:
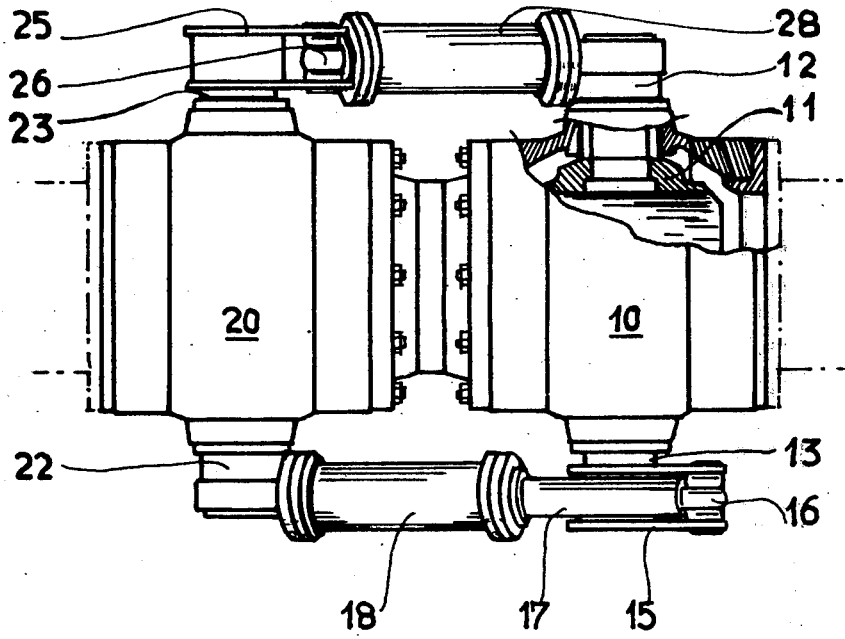

FIGS. 2 and 3 show a unit in which two spherical valves 10 and 20 are mounted in series on a pipe which is simply shown in dot-and-dash lines at both ends of the unit. The two valves are separated by a disconnecting sleeve 7. The valve 10 comprises, in known manner, an internal cut-off device 11 carried by two journals 12 and 13 which rotate freely in leaktight bearings formed in bosses on the shell 10. The journals 12 and 13 project outside the shell 10. In a completely analogous manner, the valve 20 comprises a cut-off device 21, not shown in the figures, which rotates on journals 22 and 23 projecting outside the shell 20. The 90° rotation between the open or closed positions of the cut-off device 11 is controlled by means of a lever 15 keyed on the journal 13. The end of the lever 15 is articulated at 16 on the head of the rod 17 of an operating jack 18. The body of the jack 18 is articulated on the journal 22 of the cut-off device 21. In a symmetrical manner, the rod 27 of a jack 28, the body of which jack is articulated on the journal 12 of the cut-off device 11, is articulated at 26 on the lever 25 of the cut-off device 21. In FIG. 3, the jack 18 is shown in the totally extended position, which corresponds to the fully open position of the cut-off device 11; on the other hand, the jack 28 is shown in the completely retracted position, which corresponds to the fully closed position of the cut-off device 21.

Preferably the articulations of the jacks on the levers and on the journals are cylindrical articulations.

In the arrangement which has now been described, it will be noted that the operating forces only constitute internal forces. The foundations do not bear any of these forces. Moreover, the operating forces passing through the shell do not require any special reinforcement because they remain small in comparison with the reaction of support of the cut-off device. The shell is thus approximately axisymmetrical and comprises axisymmetrical reinforcements, which makes it possible to optimise the size and make better use of material.

Figure 1:
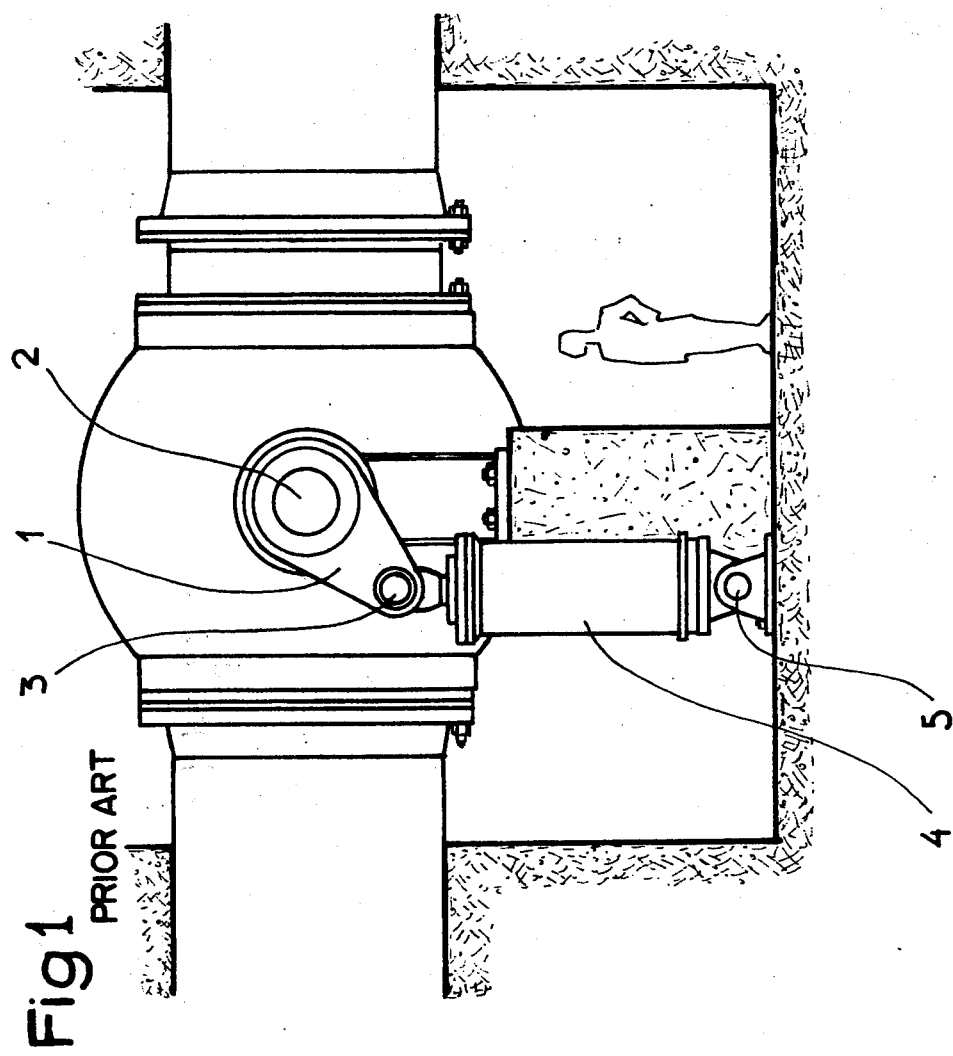

A significant reduction in bulk, compared with the conventional arrangement referred to in FIG. 1, and also compared with the arrangement with a servomotor incorporated in the shell of each valve, as described in French Pat. No. 1,363,146, will also be noted.

Figure 4:
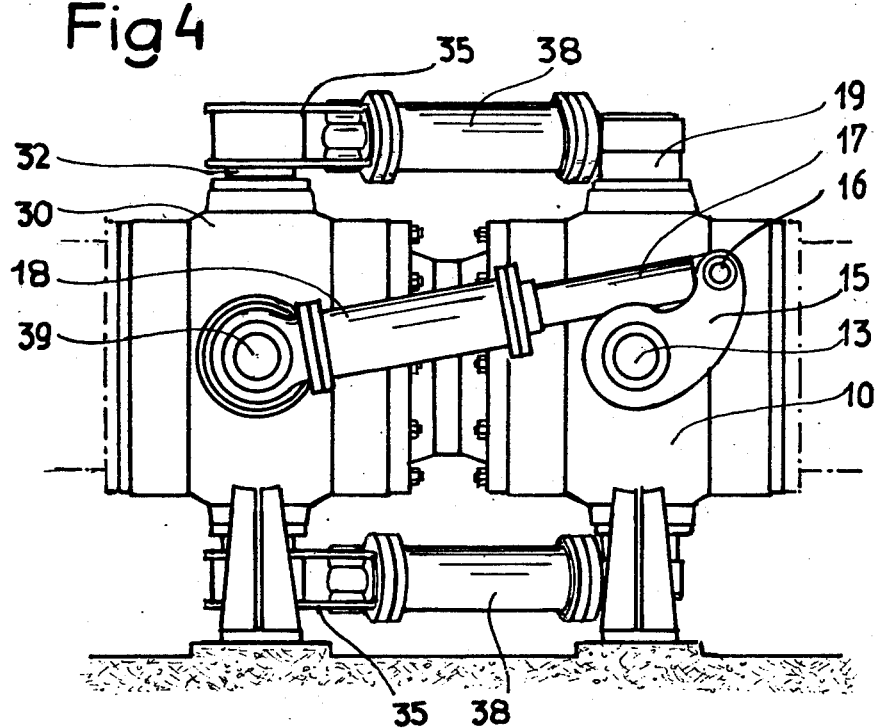
FIGS. 4 and 5 are equivalent views showing a modified embodiment according to the invention for use when the axes of rotation of the two cut-off devices of the valves are perpendicular.
Figure 5:
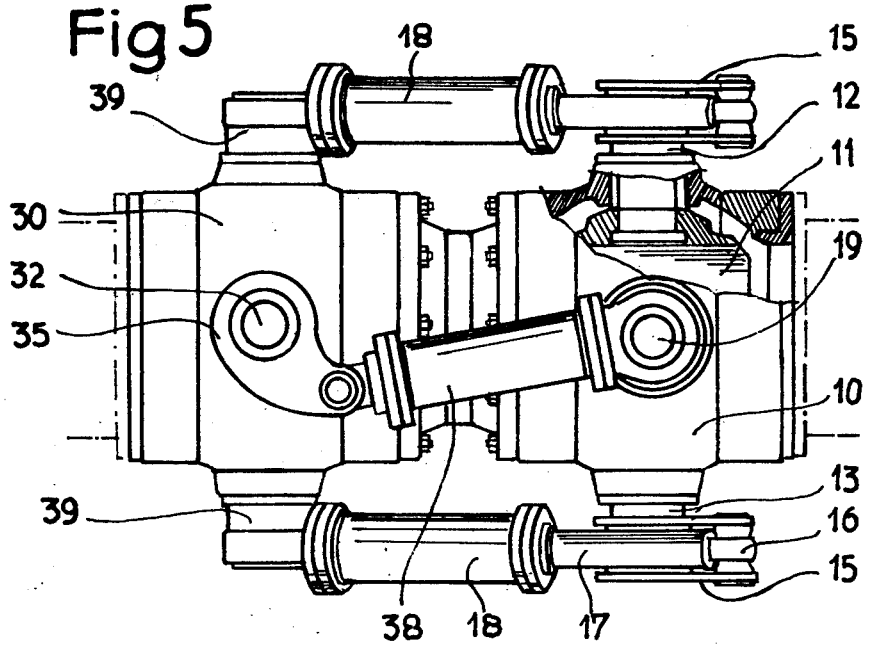

The modified embodiment shown in FIGS. 4 and 5 makes it possible to retain the symmetry of the operating forces of each cut-off device, two jacks acting in parallel on each of its two journals. In these figures, each of the journals 12 and 13 of the cut-off device 11 carries an identical lever 15 which is articulated on the rod 17 of a respective one of two jacks 18, which are supplied in parallel. The body of each jack 18 is articulated on a false journal 39, the axis of which is parallel to the journals 12 and 13, and which is integral with the shell 30 of the second valve in the zone of the journals of the other cut-off device. In these figures, the two jacks 18 are shown in the completely extended position, which corresponds to the fully open position of the cut-off device 11.

In the shell 30, the cut-off devie 31, not shown in the figures, rotates on journals 32 and 33, the axis of which is perpendicular to that of the journals 12 and 13 of the cut-off device 11. A lever 35 is keyed on each of the journals 32 and 33 and each is articulated on the rod of a respctive jack 38. The body of each jack 38 is articulated on a respective false journal 19, the axis of which is parallel to the journals 32 and 33, and which is integral with the shell 10 in the zone of the journals 12, 13. The two jacks 38 are shown in the completely retracted position, which corresponds to the fully closed position of the cut-off device 31.

Preferably the axes of the journals 19, 39 are contained in the transverse planes containing the axes of the journals 12, 13 and 32, 33 respectively.

Of course, the invention is not intended to be strictly limited to the embodiments which have been described by way of example; on the contrary, it also includes embodiments which only differ therefrom in details, in different methods of operation or in the use of equivalent means.

Figure 6:
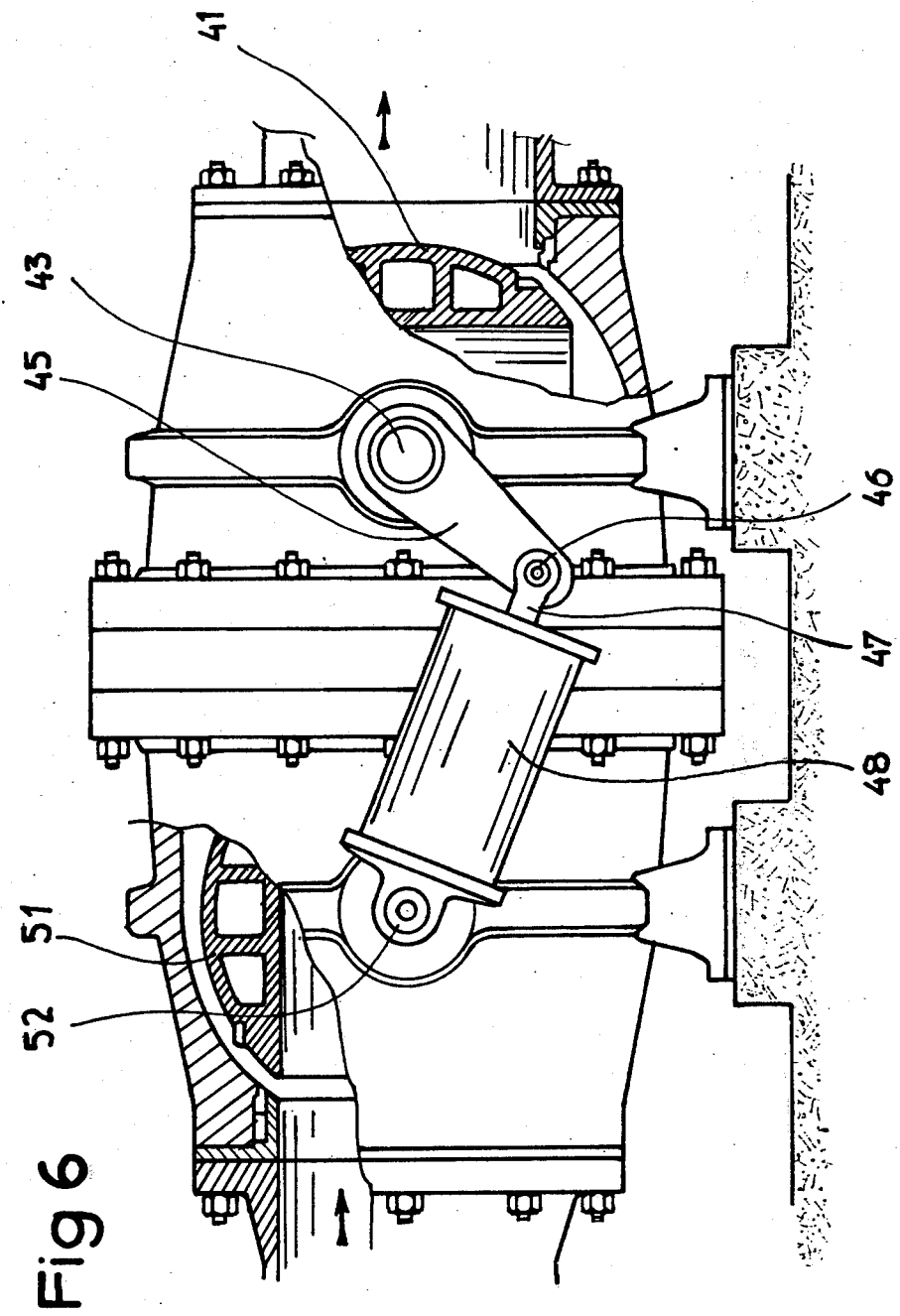
FIG. 6 is a side elevation with partial sections of an embodiment according to the invention for use where the double valve with two cut-off devices is housed in one and the same shell.

Thus, the control mechanisms which have been described above for two separate valves, apply in an absolutely analogous manner to the case of a double valve with two cut-off devices in the same shell, for example as shown in FIG. 6 for the case where the axes of the cut-off devices are parallel. As shown in FIG. 6 a jack 48 for controlling spherical cut-off device 41 is articulated on the free journal 52 of cut-off device 51. The rod 47 of the jack 48 is articulated at 46 on lever 45 for controlling journal 43 of the cut-off device 41. A symmetrical arrangement, on the other side of the unit, is provided for operation of the other cut-off device 51.

What is claimed is:
1. A hydraulic valve assembly, particularly for use in a high-drop hydraulic turbine installation, said valve comprising:
    dual rotary valves arranged in tandem, said valves each having a casing which is rigidly interconnected with the casing of the other of the valves in series flow relationship;
    a rotary valve member within each casing;
    a journal associated with the valve member of each valve and which extends diametrically through the casing and terminates at at least one of its ends exteriorly of the casing;
    an operating lever rigidly attached at one end to said one exteriorly extending end of each of said journals;
    a hydraulic jack journalled at one of its ends to the other end of each of said operating levers; and
    a member carried by the other valve casing of each of said valves and which provides a support for an opposite end of each of said hydraulic jacks.
2. The hydraulic valve assembly of claim 1, wherein the journals of the respective valves extend parallel to each other and said operating levers are located on opposite sides of said valve assembly, and the journal of each valve extends diametrically through its associated valve casing and terminates at both of its ends exteriorly of said casing, an end of each journal opposite said one end constituting said support member for said opposite end of said hydraulic jack associated with the other of said journals.
3. The hydraulic valve assembly according to claim 1, wherein the journal of each valve extends diametrically through its associated valve casing and terminates at both of its ends externally of said casing, the axis of rotation of one of the journals is displaced angularly relatively to the axis of rotation of the other of the journals.
4. The hydraulic valve assembly according to claim 3, wherein the respective journals are positioned with their axis of rotation displaced transversely of the axis of rotation of the other of the journals.
5. The hydraulic valve assembly according to claim 3, wherein each said support member is constituted by a stub shaft rigidly secured to each of said casings of each one of the valves and which axis extends parallel to the journal of the other of said valves.

* * * * *